United States Patent [19]

Appelblatt et al.

[11] Patent Number: 4,484,765
[45] Date of Patent: Nov. 27, 1984

[54] SUSPENSION SYSTEM FOR WHEELED VEHICLES

[75] Inventors: Irving Appelblatt, West Bloomfield; Theodore A. Jackson, Utica; James D. Crabtree, Crabtree, all of Mich.

[73] Assignee: Cadillac Gage Company, Warren, Mich.

[21] Appl. No.: 334,696

[22] Filed: Dec. 28, 1981

Related U.S. Application Data

[63] Continuation of Ser. No. 100,602, Dec. 5, 1979, abandoned, which is a continuation of Ser. No. 842,213, Oct. 14, 1977, abandoned.

[51] Int. Cl.³ .............................................. B60G 4/14
[52] U.S. Cl. ..................................... 280/725; 180/233
[58] Field of Search ................. 180/252, 233; 280/666, 280/664, 696, 725, 201; 89/36 H

[56] References Cited

U.S. PATENT DOCUMENTS

| 2,740,640 | 4/1956 | Schaefer | 280/666 |
|---|---|---|---|
| 2,760,787 | 8/1956 | Muller | 280/696 |
| 2,814,503 | 11/1957 | Porsche et al. | 280/664 |
| 3,048,232 | 8/1962 | O'Brien | 180/233 |
| 3,074,737 | 1/1963 | Peras | 280/666 |
| 3,163,443 | 12/1964 | Hickman | 280/666 |
| 4,158,986 | 6/1979 | Appleblatt et al. | 89/36 H |

FOREIGN PATENT DOCUMENTS

| 618226 | 2/1961 | Italy | 280/666 |
|---|---|---|---|

Primary Examiner—Joseph F. Peters, Jr.
Assistant Examiner—Ross Weaver
Attorney, Agent, or Firm—Krass & Young

[57] ABSTRACT

A suspension system for wheeled vehicles, particularly adapted to extended travel suspension systems for armored wheeled vehicles in which each of the front and rear vehicle wheel assemblies is mounted on a trailing arm suspension. The front suspension system includes an axle housing supported at either outboard end by a bell crank assembly, each including a trailing arm pivotally mounted to the axle housing at one end and at the other to a pivotal support on the vehicle hull or frame with a second shorter crank arm acting on a coil spring to resist arm motion by compression of the spring. Within each coil spring is disposed a stack of rubber bumper elements compressed with the spring while a pair of rubber bushings is provided at each pivot point of each of the trailing arms, the damping action of the stack bumpers and bushings performing a shock absorbing function. The rubber bushings also act as torsional springs and to accommodate limited tilting motion of the axle housing. The trailing arms each are inclined inwardly to closely position the coil springs, which extend generally horizontally within the nose of the vehicle hull to minimize the overhead clearance required and provide ready access to the coil springs. An independent trailing arm suspension supports the rear wheels, with a bell crank assembly compressing respective coil springs with driving power delivered by means of universal joints from a fixed differential gear unit.

5 Claims, 12 Drawing Figures

SUSPENSION SYSTEM FOR WHEELED VEHICLES

This application is a continuation of application Ser. No. 100,602, filed Dec. 5, 1979, now abandoned, which is a continuation of application Ser. No. 842,213, filed Oct. 14, 1977, now abandoned.

BACKGROUND DISCUSSION

The ability of a suspension system to absorb the shock imposed on the wheels of the vehicle in encountering terrain or road features is largely dependent on the extent of travel through which the wheels may move relative to the vehicle frame. While there are many considerations involved in the design of suspension systems for various type vehicles, for overall best performance, for military off-the-road vehicles, this factor is of most significance. That is, the maximum speed of the vehicle in negotiating cross country terrain features and the severity of the terrain roughness is limited by the extent of travel available from the suspension system. This is of course the measure of the suspension system's ability to absorb the impulse imposed on the wheel over an extended time period to thereby reduce the maximum force ultimately transmitted to the vehicle frame.

The resulting shock levels which cannot be tolerated are those which would preclude the driver maintaining effective control of the vehicle or would result in failure of vehicle components due to excessive stress levels. This design constraint is rendered more difficult by the military requirement that the suspension components by simple, rugged and reliable and shielded so as to be afforded maximum protection from damage from enemy fire or road obstructions. This, while still being reasonably accessible for maintenance functions on these components.

For track laying vehicles such as tanks, a trailing arm suspension combination with torsion bars adequately serves this goal. Wheeled vehicles, however, generally do not have sufficient chassis or hull width to enable adequate wind up of the torsion bar for maximum travel of the suspension system, and in addition, the torsion bar suspension does not readily lend itself to axially aligned wheel sets, which arrangement, of course, is required in wheeled vehicles.

Another constraint imposed is that of accommodating the suspension components within the vehicle hull if the vehicle is armored. If coil springs are utilized in the conventional manner, the height of the coil springs required to provide optimum travel would require a spring height which would either result in exposure of the springs outside the vehicle hull, or if enclosed would exceed the vertical depth of the vehicle hull available if extended travel were required.

Particularly is this so for front wheel suspension systems which are generally located in a region which requires sloping of the upper surfaces as a strong design objective. This necessarily requires a minimum hull dimension in this area. Leaf springs, on the other hand, generally cannot afford sufficient travel for a high performance suspension.

While adequate travel has been afforded provided by independent suspension systems, that is, systems in which each of the front wheels are supported independently of each other by the suspension system, the requirement that the wheels be supported so as to be capable of steering movement creates considerable complexity, particularly when the military requirements for simplicity and ruggedness are considered. Such vehicles usually also involve powering of the front wheels, and a drive to the wheels must be provided.

For this reason, there has not heretofore been provided an adequate front suspension system which provides for extended travel of the wheels by a simple rugged suspension system which is adaptable to hull configurations of minimal depth and which allows relatively easy access to the components thereof requiring maintenance.

An additional complicating feature in such suspension systems is the requirement for shock absorbers to provide a dampening or dissipating force on the suspension movements. A shock absorber of conventional piston-in-cylinder design is an item of considerable vulnerability and complexity and a major maintenance item.

While the rear suspension design is not as difficult since it is not required to be adapted to steering and not located in a region of narrow hull width, it nonetheless should accommodate the same travel as the front suspension.

Such military vehicles are often required to negotiate vertical obstacles of considerable height. The ability of the vehicle to do so depends in some measure on the rearward reaction imposed on the vehicle in order to produce travel of the wheels on the suspension. Since most suspension systems have the wheels deflecting straight upwardly, the rearward reaction is considerable.

It is thus an object of the present invention to provde a suspension system for a wheeled vehicle which accommodates extended travel of the wheels by a simple, rugged suspension system which is readily adaptable to military off-the-road vehicles due to its ruggedness and its ability to be housed within a vehicle hull of minimal dimensions.

It is yet another object of the present invention to provide such a suspension system particularly adapted to steerable front wheels which are also powered without introducing a complex, delicate suspension component and which is accordingly extremely durable and rugged while allowing ready access to the components for maintenance purposes.

It is yet another object of the present invention to provide a suspension system in which a need for a separate shock absorber is eliminated while insuring that the suspension energy absorbed is dissipated to provide adequate damping.

It is still another object of the present invention to provide a suspension system which minimizes the rearward reaction force on the vehicle in negotiating vertical obstacles.

SUMMARY OF THE INVENTION

These and other objects of the present invention, which will become apparent upon a reading of the following specification and claims, are accomplished by a trailing arm suspension system for both the front and rear wheels of a wheeled vehicle. The front suspension system includes a pair of bell crank assemblies mounting a respective front wheel assembly, each comprised of a trailing arm pivotally mounted to one end of an axle housing means of brackets secured to the ends of the axle housing. The opposite ends of the trailing arms are pivotally supported on the vehicle frame or hull with a shorter effective length crank arm connected to each trailing arm each acting to compress a forwardly extending coil spring by movement of the crank arm is response to wheel movement. Each coil spring includes a stacked series of rubber bumper elements which are compressed along with the spring to produce a composite spring rate and a damping force due to the inherent damping of the rubber.

The suspension system also includes a pair of constraining links, one each pivotally connected to each end of the axle housing and to the vehicle frame constraining movement of the axle housing during movement on the trailing arms to maintain the orientation of the axle housing with respect to the vehicle frame in order to prevent any stresses from being imposed on the steering rods or the vehicle drive shaft. A sway bar extending parallel to the axle housing and pivotally connected to it and to the vehicle frame controls the side-to-side movement of the axle housing. The bell crank pivotal mountings between one end of the trailing arm and the axle housing and between the other end thereof and the frame include resiliently compressible bushings which resist oscillations of the bell crank assemblies to provide an additional torsional spring force and which also act to bidirectionally dissipate suspension energy to contribute to the system damping, in addition to that provided by the stacked bumper elements within each coil spring. The bushings additionally accommodate a degree of tilting movement of the axle housing by resilient deflection thereof. The axle housing mounts a differential gear unit, driving a pair of axle shafts which power the wheels via universal joints which accommodate tilting movement of the pivot housings on which the wheel assemblies are mounted in accommodating the steering action by the conventional steering arm system.

The front suspension system is particularly suited to armored vehicles by an adaptation of the hull configuration.

Each of the front wheels is disposed within a hull recess providing a wheel well, each of which is covered by a displaceable fairing panel, the axle housing extending through a tunnel section of the hull bottom configured to accommodate the axle housing travel during movement of the trailing arms while the displaceable panels accommodate the extended wheel travel above the upper front surface of the vehicle hull structure. The trailing arms and the constraining arms both extend inwardly toward the central region of the vehicle hull in order to partially absorb side forces acting on the axle housing with respect to the vehicle frame and to locate the horizontally extending coil springs within the front nose portion of the vehicle hull positioned in close proximity to each other to allow access thereto by single access panel formed in the upper surface of the vehicle hull.

The rear suspension also incorporates a bell crank arrangement, each supporting a wheel mounting structure with independent suspension provided by universal joints and spline connections for drive shafts driven from a fixed differential gear unit. Each of the bell cranks includes a trailing arm member secured to the wheel mount structure with corresponding crank arms and pivotal mounts causing horizontally positioned coil springs to be compressed by rotation of the bell crank trailing arms produced by vertical travel of the rear wheels.

DETAILED DESCRIPTION

In the following detailed description, certain specific terminology will be utilized for the sake of clarity and a specific embodiment described in accordance with the requirements of 35 USC 112, but it is to be understood that the same is not intended to be limiting and should not be so construed inasmuch as the invention is capable of taking many forms and variations within the scope of the appended claims.

The suspension system according to the present invention has particular application to armored vehicles of the type including a hull structure comprised of a casting or armor plate weldment and which hull serves as the vehicle frame means, i.e., provides the structural integrity for the vehicle and absorbs the suspension system loads. As will be described hereinafter, there are particular advantages to the configuration of the front suspension system according to the present invention in conjunction with certain hull contours, but it is to be understood that the suspension system is also applicable to other vehicles in which an extended travel suspension system is sought, i.e., conventionally framed, high speed, off-the-road vehicles.

Figure 1:
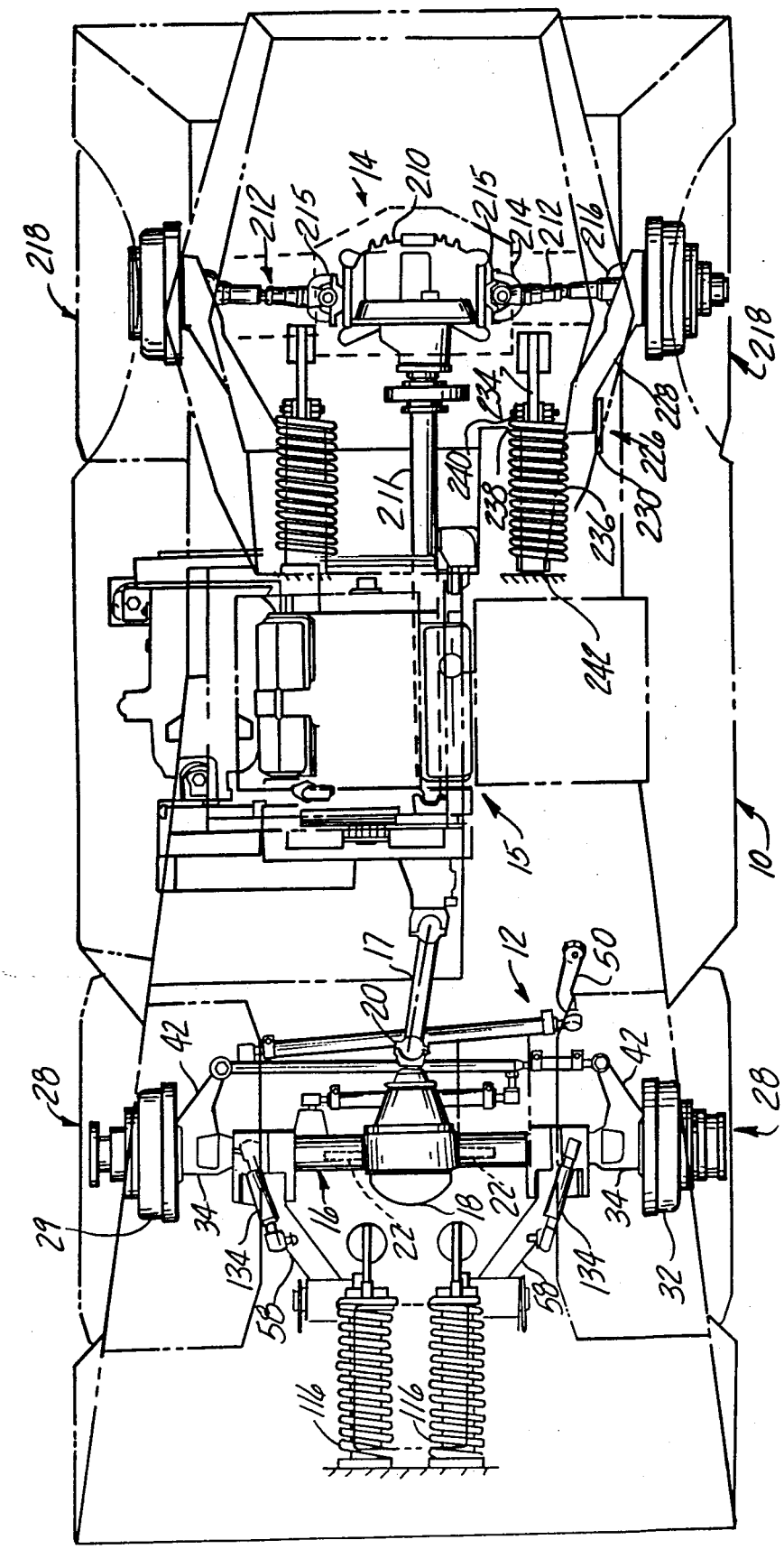
FIG. 1 is a plan view of front and rear suspension components of the suspension system according to the present invention together with the drive arrangements from the vehicle power plant.
Figure 2:
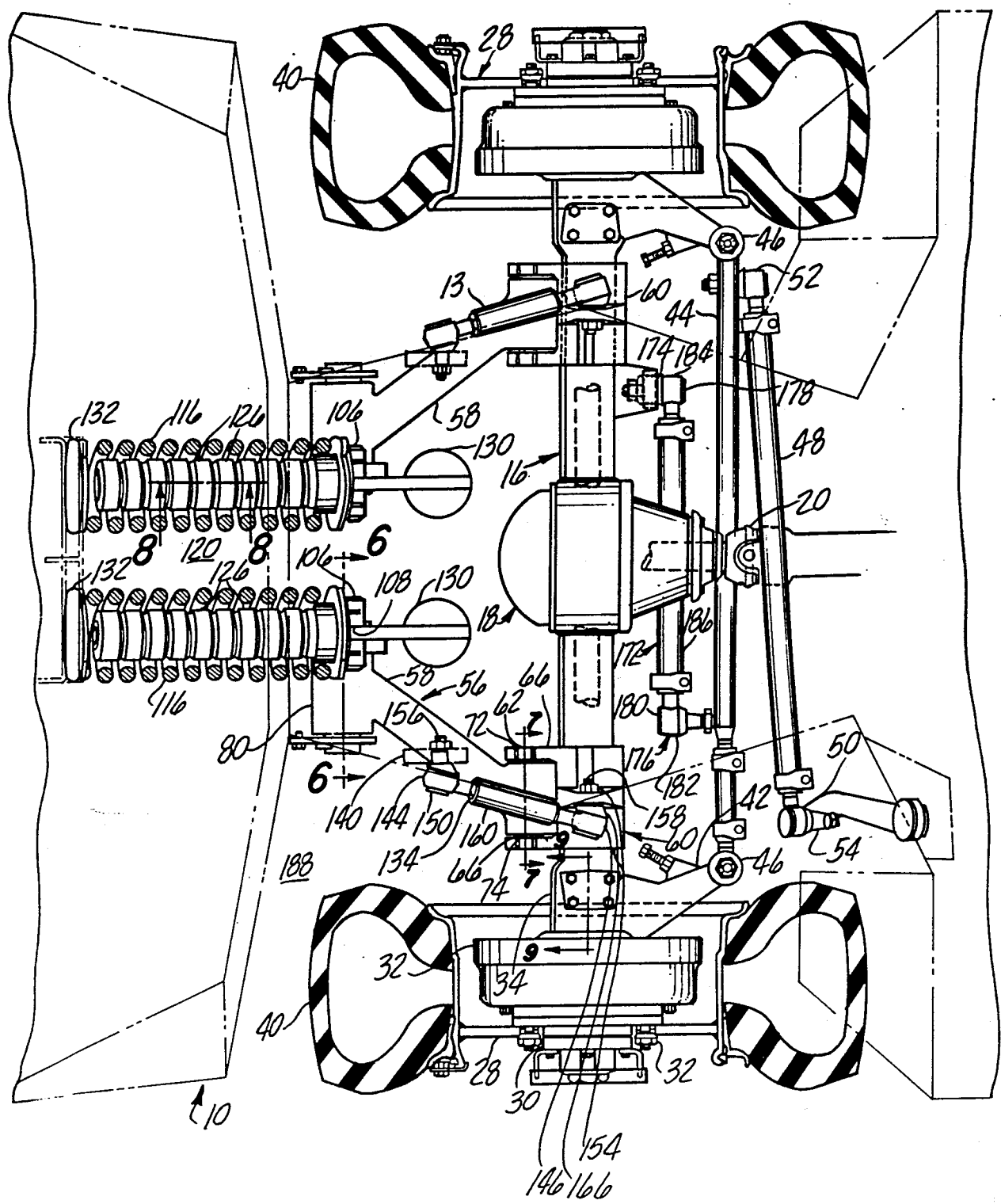
FIG. 2 is an enlarged plan view of the front suspension components shown in FIG. 1.
Figure 3:
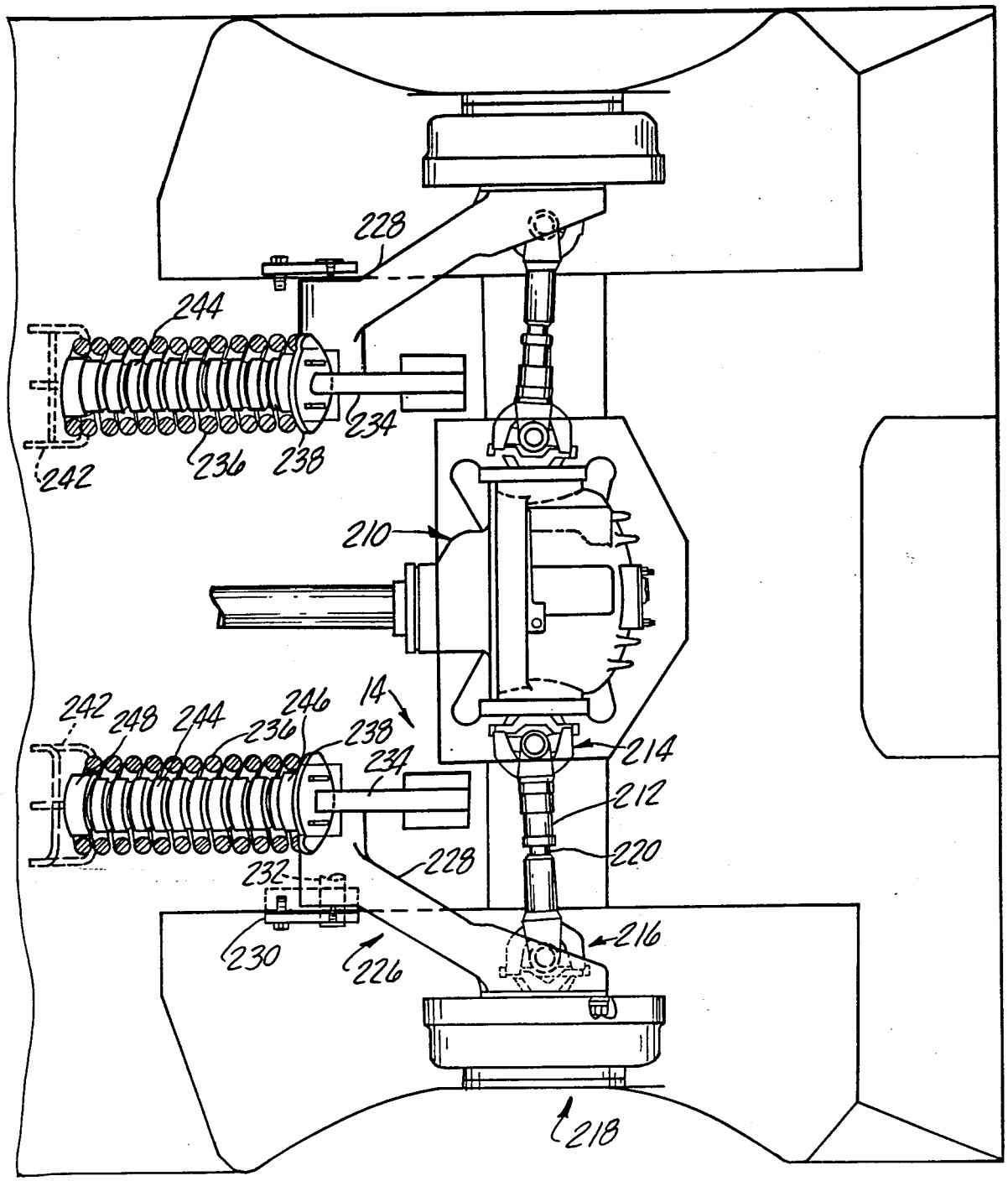
FIG. 3 is an enlarged plan view of the rear suspension components shown in FIG. 1.
Figure 4:
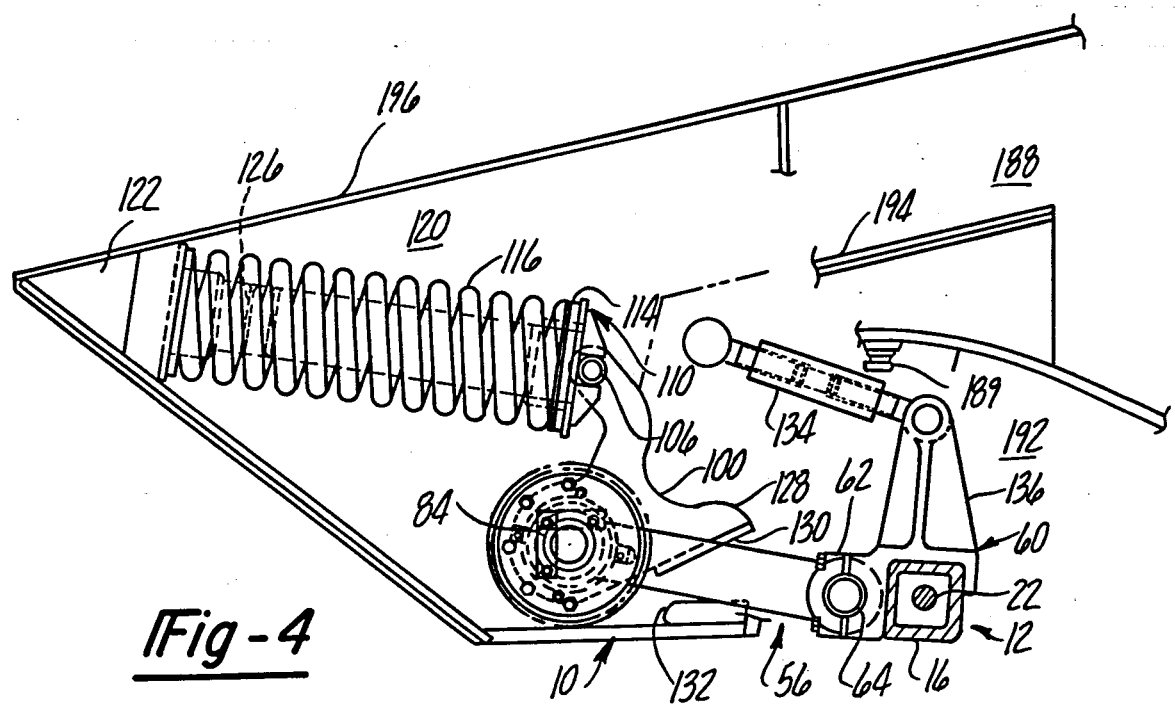
FIG. 4 is a side elevational view of the front suspension components shown in FIG. 2, portions thereof partially omitted for the sake of clarity.
Figure 5:
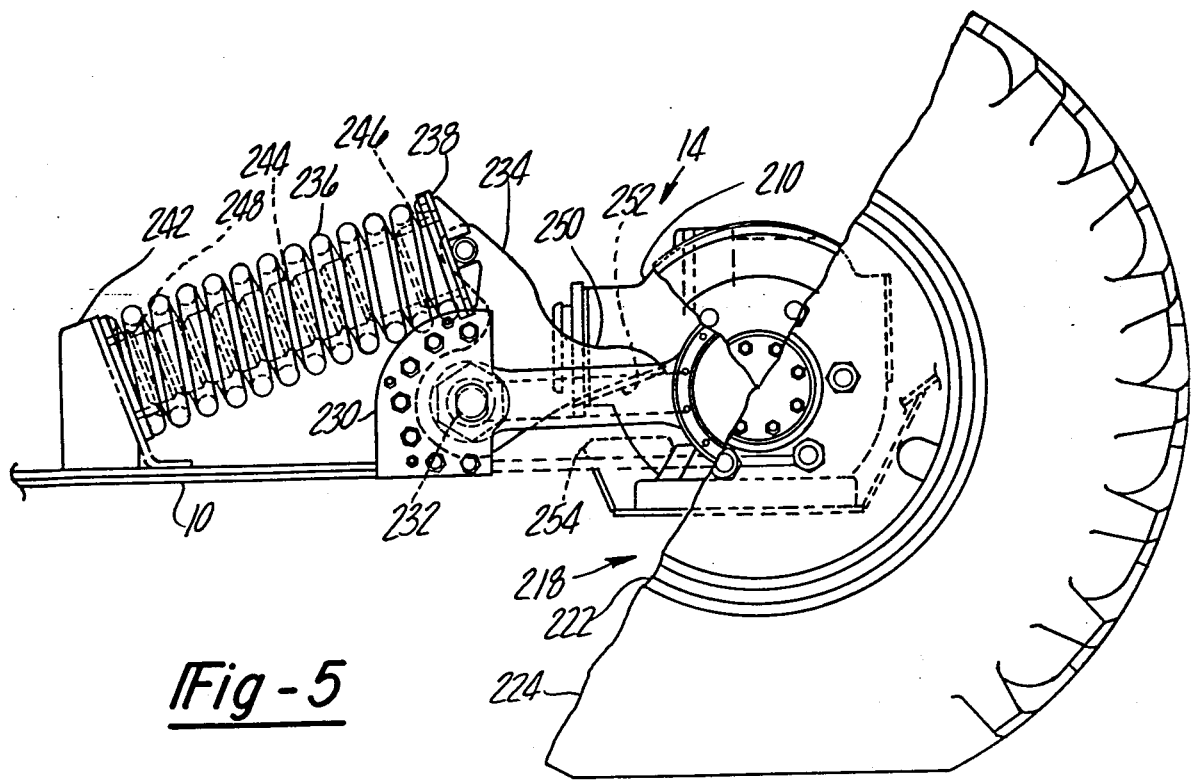
FIG. 5 is a side elevational view of the rear suspension components shown in FIG. 3.
Figure 9:
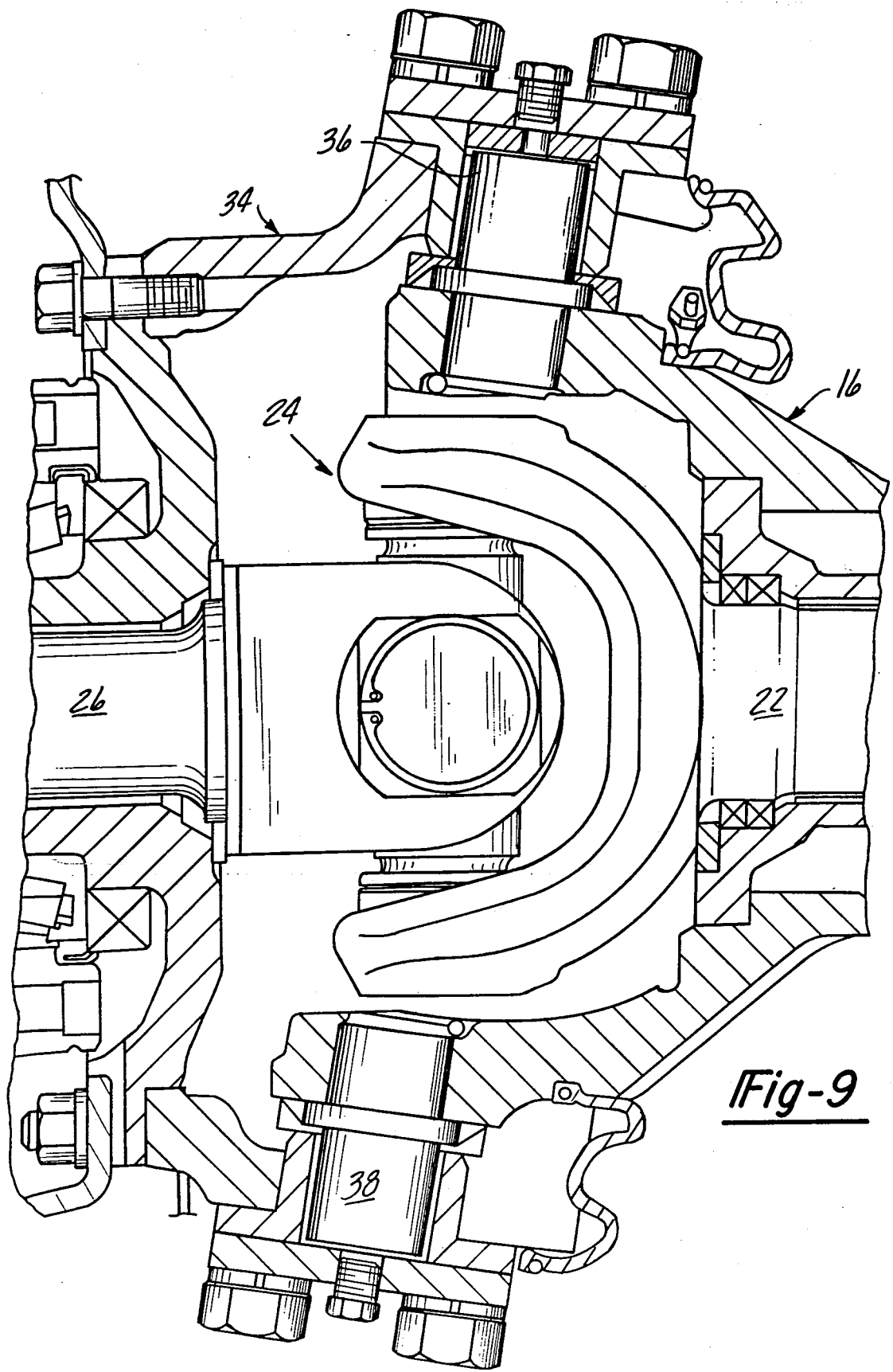
FIG. 9 is a partial view of section 9—9 taken in FIG. 2.

In FIGS. 1 through 3, the outlines of the hull structure 10 are shown along with the installation of the front suspension 12 and rear suspension 14. The front suspension system 12, shown in detail in FIG. 2, includes a rigid axle housing 16 which is mounted to a trailing arm type suspension as will be described hereinafter in detail. The axle housing 16 includes a central region 18 within which is mounted a conventional differential gear unit adapted to be driven by the vehicle power plant 15 and a drive shaft 17 coupled to the differential input flange 20. The differential gear unit is adapted to drive a pair of axle shafts 22 in the conventional manner, each mounted within an axle housing 16 and one of which is shown in FIG. 9.

Each axle shaft 22 extends to a respective outboard end of the axle housing 16 at each side of the vehicle hull 10 and is connected by means of a universal joint 24 to a wheel stub shaft 26 which is adapted to drive the vehicle wheel assembly 28 by having an integral hub 30 bolted to the brake drum 32 which in turn is bolted to the wheel 31 by stud-nut assemblies 32. The vehicle tires 40 are heavy-walled, puncture resistant, drive-flat tires mounted to the wheels 31, as shown.

Figure 6:
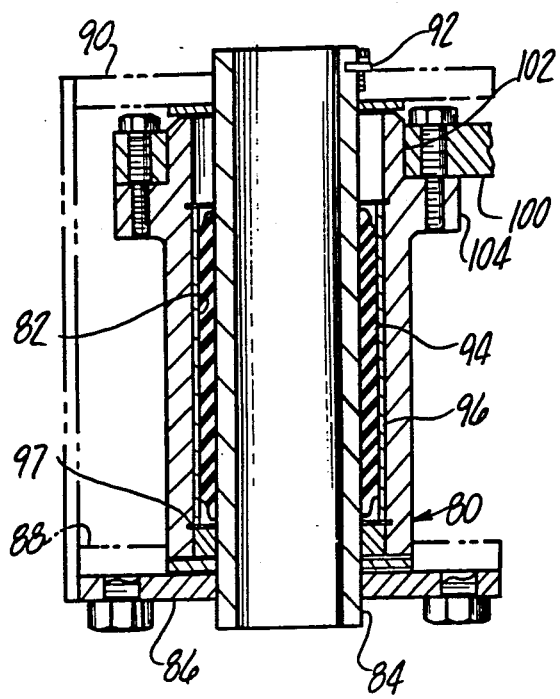
FIG. 6 is a view of section 6—6 taken in FIG. 2.

The axle stub shaft 26, the wheel 28 and brake drum 32 are all rotatably mounted by means of bearings in the conventional fashion on a pivot housing 34 which is pivotally mounted with respect to the axis housing 16 by means of a pair of king pins 36 and 38 mounted to the outboard end of the axle housing 6 at one end and to the pivot housing 34 at the other end as shown in FIG. 6.

This thus accommodates steering movement of the pivot housing 34 with respect to the axle housing 16, while mounting the wheels to the axle housing 16.

Each of the pivot housings 34 has a steering bracket 42 which is pivotally mounted at either end to a tie rod 44 by pivot connections 46. The steering movement of the tie rod 44 is produced by a relay rod 48 in turn driven by a pitman arm 50 operated by the vehicle steering mechanism (not shown). The relay rod 48 is pivotably mounted at 52 and 54 to the tie rod 44 and pitman arm 50, respectively. Rotation of the pitman arm 50 produces corresponding movement of each of the pivot housings 34 to execute the steering action.

Inasmuch as this general arrangement of the mounting of the wheel assembly, the steering gear, and the front wheel drive are conventional, the details of construction are not herein included since it is this type of arrangement in combination with the trailing arm suspension which is the subject matter of the present invention. Similarly, conventional components such as the brake mechanisms are of course included, but a description of the same is not here set forth for the same reason.

The unsprung mass constituted by the axle housing 16 as well as the pivot housing 34 and the wheel assemblies 28, are all mounted by means of a trailing arm suspension system according to the concept of the present invention. This suspension system includes a bell crank assembly 56 located at either end of the axle housing 16 immediately inboard of the connection with the pivot housing 34. Each bell crank assembly 56 comprises a trailing arm 58 extending at a shallow angle to the horizontal in this position and to the rear of the vehicle. Each trailing arm 58 is pivotally mounted at one end to the axle housing 16 by means of a bracket 60 welded or otherwise joined to the axle housing 16. The pivotal mounting means further includes a sleeve 64 secured within a bore formed within clevis plates 66 formed at either end of the bracket 60 and caps 62. The sleeve 64 passes through a bore 68 formed in the end 70 of the trailing arm 58, while bolt pairs 72 and 74 secure the caps 62 to the clevis plates 66, securing the sleeve 64 against rotation.

Figure 7:
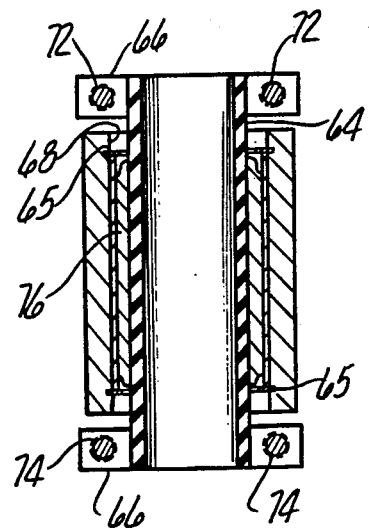
FIG. 7 is a view of section 7—7 taken in FIG. 2.
Figure 8:
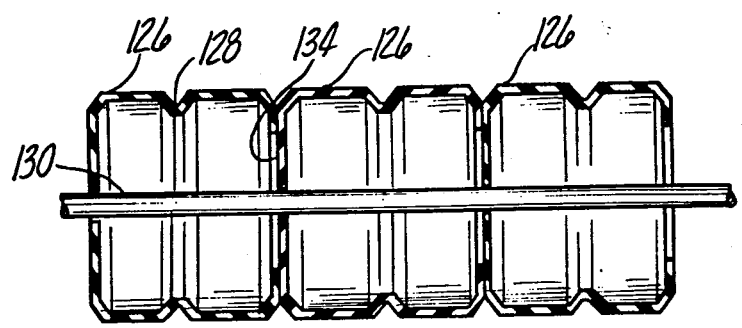
FIG. 8 is a partial view of section 8—8 taken in FIG. 2.

As seen in FIG. 7, the sleeve 64 does not directly bear on the bore 68 but rather thre is interposed a resilient bushing 76 of hard rubber which is bonded to a sleeve 78 and press fitted to the outside diameter of the sleeve 64. The sleeve 78 in turn is press fitted within the bore 68 of the trailing arm end 70 such that that burning 76 is not free to rotate with respect to the sleeve 74 or the trailing arm end 70, but is joined thereto such as to act as a turn signal connection upon relative rotation between the trailing arm 58 and the sleeve 64.

The bell crank assembly 56 further includes means for pivotally mounting the other end of the trailing arm 58 to the vehicle frame means or hull 10. This means includes a pivot boss 80 integral with the trailing arm 58, the pivot boss 80 having an internal bore 82 within which passes a sleeve 84. Sleeve 84 is formed with an end flange 86 which is bolted to plate 88 welded to the hull 10. The other end of the sleeve 84 passes through a bore formed in the second plate 90 with a key retaininer 92 mounting the outside surface of the plate 90 such as to distribute a portion of the thrust into the plate 90.

The rubber bushings 94 and 76 are installed at the front suspension system partially unloaded and after a period of time in use the rubber bushings 76 and 94 tend to oppose movement of the bell cranks 56 in either direction. Thus, the energy is absorbed in both the compression and return movement of the bell crank assemblies 56 such as to produce a reduced force level acting on the vehicle due to the dissipation of a portion of the compression energy during the return movement of the wheels.

The pivot boss 80 is mounted on the sleeve 84 by means of a second resilient bushing 94 which is similarly bonded to a sleeve 96 and pressed onto the outside diameter of the sleeve 84 such as to create a tight compression of the bushing 94 onto the diameter and create a torsional connection therebetween, such that the bushing 94 may act as a torsional spring. A pair of snap retainers 97 locate the bushing 94 endwise within the bore 82. A pair of thrust washers 98 are also provided at either end of the boss portion.

Each of the bell crank assemblies 56 further includes a crank arm 100 which is secured to the pivot boss 80 by being received over the diameter 102 of pivot boss 80 and bolted to a flange 104 as shown to be connected for rotation therewith. The crank arm 100 is of shorter effective length than the trailing arm and, accordingly, the bending loads are much higher than in the trailing arm 58. The trailing arm 58, on the other hand, may be constructed of a relatively massive aluminum forging, while the more highly stressed crank arm 100 preferably is formed of a higher strength steel alloy.

Each crank arm 100 is provided at its outer end with a cross pin 106 which is disposed within a slot 108 formed by blocks 112 secured to a compression plate 110. Compression plate 110 receives one end of a coil compression spring 116 with a short sleeve 118 being received within the interior of the coil spring 116 to pilot the end thereof. The coil springs 116, as seen in FIG. 2, extend in a slightly upward generally horizontal direction to the furthest coil point within the hull nose cavity 120 accommodating the width of the spring 116 to an anchor block 122 welded within the nose cavity 120 such as to provide a reaction point for the other end of the compression spring 116.

Similarly, a second guide sleeve 124 is secured to the anchor block 122 which receives within the interior of the coil spring 116 to pilot the other end onto the coil compression spring 116.

Disposed within the interior of the coil spring 116 is a stack of molded rubber shock absorbing bumper elements 126, the lead one of which is received within the guide sleeve 118. The bumper elements 126 are of a type which are commercially available under the trade name Aeons. Each of the shock absorbers comprises a molded hard rubber double doughnut shaped bumper element as shown in FIG. 9, with inwardly extending surfaces at either end, stacked in end-to-end relationship.

The reduced diameter waist 128 increases the compressibility and controls the deflection of each bumper element 126. These may be merely loosely positioned by means of a strap 130 passing through the mounting hole 132 and the open end 134 of each of the bumper elements 126. The stack is confined by the inside diameter of the coil springs 116 such that the compression of the bumper elements 126 can take place without buckling of the column. Thus, this combination acts as a composite spring since the series is adapted to be compressed upon continued compression of the coil spring 116. The stack also acts as a shock absorber since the hard rubber material has a high internal damping characteristic.

Crank arm 100 is formed with a spur projection 128 which is provided with a pair of discs 130 which are adapted to engage a bumper pad 132 upon full stop travel of the wheels 40 to the down position.

The attitude or orientation of the axle housing 16 during travel of the axle housing 16 on the crank 56 is constrained by a constraining link 134 which is pivotally connected at one end to an upwardly extending extension 136 of the bracket 60 and pivotally mounted to the vehicle hull 10 at the other end thereof by a pivot connection 140 passing through an anchor bracket 142 secured to the vehicle hull 10. The pivotal connection is provided by link ends 144 and 146 having openings thereof adapted to receive anchor pivots 148 and 150 secured by means of lock nuts 152 and 154 cooperating with threaded ends 156 and 158 formed on the pivot bars 150.

The constraining links 134 may be adjusted in length at assembly by the threaded ends 144 and 146 being threadably received within a central threaded cylinder 160 with locking nuts 162 maintaining the adjusted position. Since each of the constraining links 134 is inclined with respect to the axle housing 16 and the bracket plate 142, each of the anchor pivots 150 are provided with a transition washer 164, 166, respectively. Rotation of the anchor pivots 150 is precluded by the tapered section 168 and 170 formed on each of the anchor pins 150.

The constraining links 134 insure that the axis housing 16 is in a controlled orientation as the axle housing 16 moves on the trailing arms 58 so as to avoid placing undue loads on the drive shaft 17 or the steering gear.

The pivot links 134 and the trailing arms 58 are inclined inwardly with respect to the vehicle hull, i.e., they extend inwardly toward the center of the vehicle such as to be capable of absorbing a certain amount of the thrusting loads imposed on the axle housing 16 during turning and other side force inducing maneuvers or situations. However, the tilting afforded by the rubber bushings 94 and 76 requires that lateral restraint by provided in order to position the axle housing 16 laterally. This is provided by a sway bar 172 which extends generally parallel to the axle housing 16 and which is pivotally mounted about axes transverse to the axis of the axle housing 16 and 172 and 176 with a similar pivot pin arrangement 178 and 180 provided and received over rod ends 182 and 184, respectively, and are threadably mounted within the central rod portion 186.

There is provided a controlled side-to-side movement of the axle housing 16 and the structure mounted thereto as the axle housing moves on the bell crank assemblies 56. This slight movement can be caused by the components and the stress of which otherwise would be imposed on the components and absorbed by the sway bar stabilizer which serves to limit the the amount of sway to relatively slight degrees.

Bumper stops 189 are provided mounted to the hull 10 floor and adapted to provide a stop for the axle housing 16.

The trailing arm suspension thus comprises a bell crank which serves to reduce the degree of compression of the springs 116, by virtue of the difference in effective lengths of the trailing arm 58 and the crank arm 100 which allows extended travel of the wheel assemblies as the axle housing 16 moves about the pivotal mounting means.

In addition, the rubber bushings 76 and 94 act as torsion springs which further act as damping elements due to their high internal damping characteristics. This is augmented by the bumper elements 126 which serve to provide a compensate spring rate since they are compressed simultaneously with the coil spring 116 such that the degree of travel afforded by both the relative dimension of the effective lengths of the trailing arm 58 and the crank arm 100 and in addition the torsional wind up accommodated by the rubber bushings 76 creates an extended travel afforded by this arrangement, with the high internal damping characteristics eliminating the need for a separate shock absorber.

In addition, both the rubber bushings 76 and 94 accommodate a certain degree of relative tilt as the axle housing 16 tilts due to uneven terrain laterally of the axis of the vehicle. This degree of tilt is approximately five degrees per bushing which compounds to accommodate approximately ten degrees of axle housing tilt which is sufficient to accommodate the normal movement of the axle housing 16.

The movements afforded by this suspension system are accommodated to the hull contour in a unique fashion. The vehicle front wheels 40 are disposed within wheel well cavities 188 formed within the hull 10. The intermediate region 190 between the wheel well recesses 188 comprises a tunnel contour 192 through which passes the axle housing 16 and the connected differential housing 18. The tunnel contour 192 is adapted to accommodate the vertical movement of the axle housing and differential housing 18 through the normal travel of the suspension system allowed. The bell crank assemly 56 and the constraining links 134 are disposed at the outboard ends of the axle housing 16 generally within the confines of the wheel well recesses 188 and extend at an inclination to the axis of the axle housing 16 and are covered by a plate 194 welded within the interior of the wheel well recesses 88. This inclination allows the coil springs 116 to be disposed relatively close to each other and within the nose cavity 120 of the hull allowing access for maintenance purposes through a single access plate 196 provided in the upper surface of the hull 10.

It will be seen that the components of the suspension system are arranged to be very admirably suited to a hull having a limited depth in the region of the front suspension 12, that is, the compression spring 116 is arranged forwardly and into the nose cavity 120 in a generally horizontal direction such that space or hull depth required in order to accommodate the same is not great. This is particularly so by the provision of a bell crank assembly 56 which reduces the extent of the compression travel of the coil springs 116 which is further aided by a wind up of the rubber bushings 76 and 94. It can be further seen that the arrangement of components is such as to afford maximum protection for the vulnerable components since the springs, the most vulnerable aspects of the suspension system, are contained within the hull, while at the same are the pivots associated therewith and are relatively accessible for maintenance purposes. The remainder of the components which must be serviced, i.e., the other pivotal mounts, are all without the hull space allowing access thereto for servicing, but these components are disposed well within the wheel well recesses and are not as highly vulnerable as the vehicle springs. The various components are of rugged construction and the overall arrangement is quite simple such as to reduce the vulnerability of the system.

The wheel travel 40 is within the wheel wells 188, but due to the extremely large extended travel afforded by the present suspension system and the limited hull depth afforded by the armored vehicle design shown, the depth of the wheel wells cannot accommodate the entire wheel travel. For this reason, the wheel wells 188 are not enclosed at the upper ends thereof with the hull upper surface, but rather displaceable wheel well fairing panels 202 are utilized which, upon engagement by the front vehicle wheel assemblies 40, are deflected upwardly out of the way to allow extreme displacement of the suspension system. This arrangement is the subject matter of copending application Ser. No. 842,216, filed Oct. 14, 1977 now Pat. No. 4,174,653 and, accordingly, a full discussion of the details here is not included. However, by reference to FIG. 12, the principle involved can be appreciated.

The vehicle 200 as shown is provided with a respective pair of fairing panels 202 which cover the intersection of the wheel well recesses 188 and the upper surfaces 204 of the hull. Each fairing panel 202 is spring mounted to rotate about a pivot point 206 upon engagement of the under surface thereof by either of the front wheels 40 against the bias of the wind up springs 208 upon travel of the wheel 40 to the return position, the fairing panels 202 again become positioned flush against the surface 204 of the hull 10.

The advantages of this approach are discussed in detail in the copending application.

It can be seen that the extended travel suspension according to the present invention and the space advantages and arrangements of the components discussed above is that an extended travel suspension system for the front wheels, while allowing the front wheels to be powered and steered, and at the same time accommodates an extended travel thereof within the confines of a relatively narrow hull sectional area at the point at which the axle housing 16 passes through the hull.

The overall configuration of the vehicle components of the vehicle shown is the subject matter of copending application Ser. No. 842,214 filed Oct. 14, 1977, now U.S. Pat. No. 4,158,986 assigned to assignee of the present application.

Figure 12:
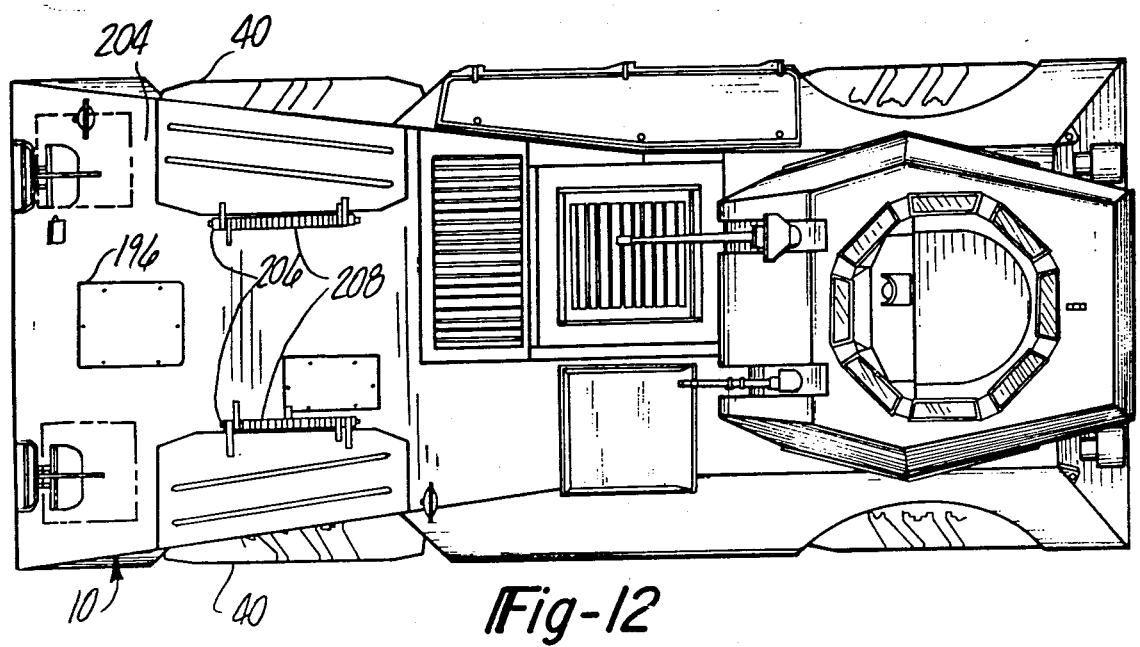
FIG. 12 is a plan view of the vehicle shown in FIGS. 10 and 11.
Figure 10:
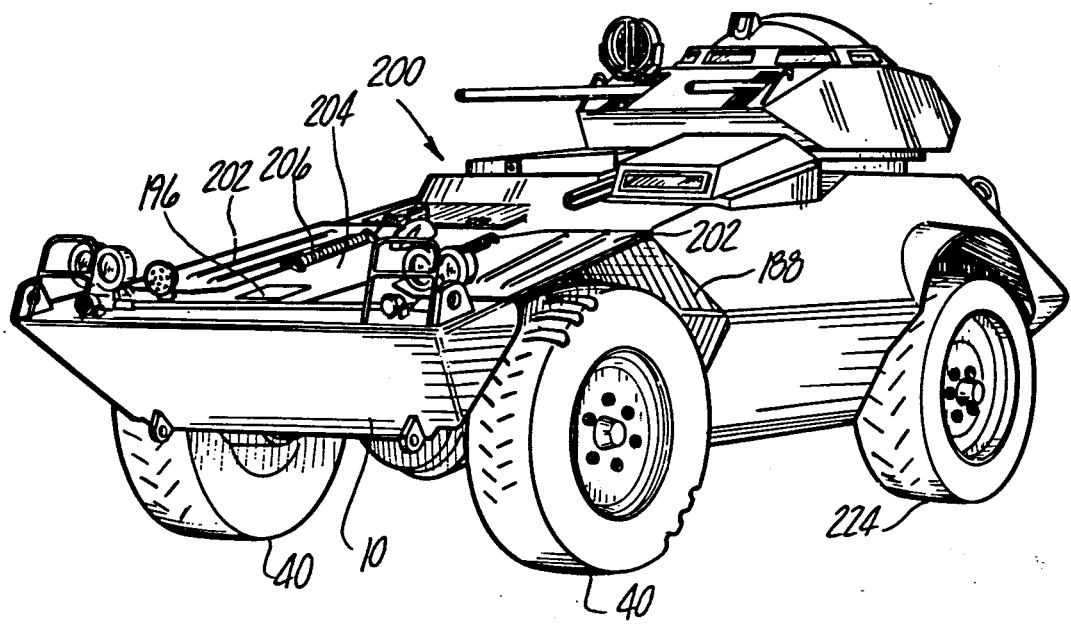
FIG. 10 is a perspective view of an armored vehicle of the type intended to be adapted to the utilization system according to the present invention.
Figure 11:
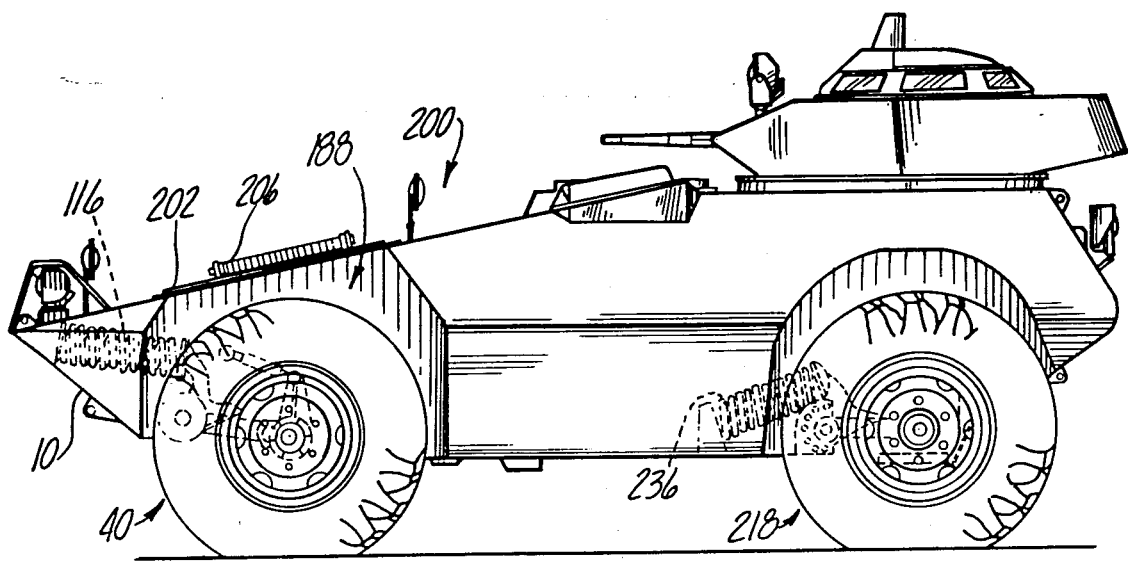
FIG. 11 is a side elevational view of the vehicle shown in FIG. 10

This allows the very advantageous extended obliqueness to the hull shown in FIGS. 10 through 12 as described more completely in that application.

The rear suspension similarly includes a trailing arm type suspension, but the absence of a need to steer the rear wheel assemblies allows the use of a simpler arrangement. The differential housing 210 is fixed to the vehicle hull 10, the differential gear unit driver by drive shaft 211 and the power plant 15, to thus provide a four-wheel drive. A pair of splined drive shafts 212 connected by universal joints 214 and 216 to the differential gear output shaft 215 and the rear wheel assemblies 218, respectively, allows swinging movement of the rear wheel assemblies 218 while maintaining the driving connections via the universal joints 214 and 216. A splined connection is provided to accommodate the change in length required as the wheel assemblies 218 traverse on the rear suspension.

The rear tires 222 are mounted on wheels 224 in the conventional fashion.

The rear suspension system similarly includes a bell crank 226 including a trailing arm 228 rotatably supporting the wheel assembly 218 thereon while carrying the wheel assemblies through an arcuate movement about a pivot provided by a fixed bracket 230 accommodating a pivot shaft 232. The crank arm 234 is adapted to compress a rear coil spring 236 by means of a compression plate 238 engaged by the crank arm 234 by means of a pin 240. In similar fashion, the opposite end of the coil spring 236 is anchored to an anchor block 242 engaging the opposite end of the spring 236. A plurality of rubber shock bumpers 244 are stacked within the interior of the coil spring 236 within the pilot 246 provided to be received within the interior of the coil 236 in order to guide the same. A spur portion 250 is provided on the crank arm 234 which has a stop plate 252 affixed thereto adapted to engage a bumper pad 254 upon extended up travel of the wheel assemblies 218 to provide a stop therefor.

This arrangement likewise accommodates a great deal of travel without requiring a relatively great overhead clearance for the rear suspension. The problem of accommodation within the hull is not nearly so difficult since the wheels need not be steered and in addition the hull depth usually is at a maximum in this region. Nonetheless, a simplified suspension is also afforded by the trailing arm approach and the application to the rear suspension and the use of the stacked bumper elements 244 also eliminates the need for separate shock absorbers.

Both the front and rear suspensions have a trailing arm minimizing the rearward forces created by encountering of a vertical obstacle, such as to afford a relatively great obstacle climbing ability. This is further enhanced by the downwardly sloping front surface 260 of the hull 10, which can act to cam the front surface up to allow engagement by the front wheels 28.

Accordingly, it can be appreciated that the objects of the present invention have been achieved inasmuch as the suspension system provides an extended travel of the components to enable the vehicle to traverse rough terrain at relatively high speeds by virtue of the resultant reduction of shock forces imposed on the vehicle hull. In addition, the suspension system components are simple and rugged in design and which are installed relative the hull such as to minimize vulnerability of these components without rendering them inaccessible for maintenance operations. The simplicity of the system is enhanced by the elimination of separate shock absorbers. The front suspension system allows the use of a conventional rugged single axle housing construction while being adapted to the extended travel design and which requires a minimum of hull depth in order to accommodate the components.

The overall result is a very smooth ride which may accommodate very rough terrain traversed by the vehicle at relatively high speeds while still being simple in design and relatively rugged and of minimal vulnerability.

The embodiments of the invention in which an exclusive property or privilege is claimed are defined as follows:

1. An extended travel suspension system for a high performance off-road vehicle or the like comprising:
(A) A vehicular structure;
(B) An axle assembly including
   (a) A rigid axle housing extending transversely to said vehicle structure,
   (b) Axle driveshaft means journalled within said housing for rotation about an axis extending transverse to said vehicle structure, and
   (c) A pair of universal joint connections at opposite ends of said axle housing respectively drivingly connected to opposite ends of said axle driveshaft means and adapted to be respectively drivingly coupled to a pair of ground engaging wheel assemblies;
(C) A folding linkage extending between said vehicular structure and said axle housing and including
   (a) a pair of trailing arms extending forwardly from said axle housing and each having its forward end pivotally connected to said vehicular structure at a point spaced substantially outboard of the longitudinal center line of the vehicular structure and above said axis and having its rearward end pivotally connected to said axle housing at a fold point spaced forwardly from said axis and lying generally in the plane containing said axis and the points of pivotal connection of the trailing arms to the vehicular structure,
   (b) A pair of extension arms respectively secured to opposite ends of said axle housing and extending radially upwardly from said axle housing,
   (c) A pair of constraining links each respectively pivotally connected at its rearward end to the free upper end of an extension arm and extending forwardly therefrom above and generally over a respective trailing arm for pivotal connection at its forward end to said vehicular structure, said constraining links, trailing arms and extension arms coacting in response to upward travel of an associated wheel assembly to move the associated fold point upwardly out of said plane and delimit the excusion of the associated universal joint connection; and
(D) Means connected between said folding linkage and said vehicular structure for absorbing shock loads imparted to said axle assembly through such upward travel of said wheel assemblies.

2. An extended travel suspension system according to claim 1 wherein:
(E) Each of said contraining links includes means for adjusting the effective length of the link.

3. An extended travel suspension system according to claim 1 wherein:
(E) Said trailing arms and said contraining links, as they extend forwardly from said axle housing, angle inwardly toward the longitudinal center line of the vehicular structure to provide lateral restraint for the axle assembly.

4. An extended travel suspension system according to claim 3 wherein:
(F) Said axle assembly further includes a sway bar positioned between said vehicular structure and said axle housing to provide further lateral restrain for the axle assembly.

5. An extended travel suspension system according to claim 1 wherein:
(E) The pivotal connections between the forward ends of said trailing arms and said vehicular structure, and between the rearward ends of said trailing arms and said axle housing, each include a resilient bushing which torsionally resist pivotal movement at the associated pivotal connection and allows a limited amount of tilting movement of the associated trailing arm relative to the vehicular structure and relative to the axle housing.

* * * * *